(12) United States Patent
Lu et al.

(10) Patent No.: US 8,956,760 B2
(45) Date of Patent: Feb. 17, 2015

(54) ELECTRON TRANSPORT IN HEXACYANOMETALLATE ELECTRODE FOR ELECTROCHEMICAL APPLICATIONS

(75) Inventors: Yuhao Lu, Vancouver, WA (US); Jong-Jan Lee, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 260 days.

(21) Appl. No.: 13/523,694

(22) Filed: Jun. 14, 2012

(65) Prior Publication Data

US 2013/0260021 A1 Oct. 3, 2013

Related U.S. Application Data

(63) Continuation-in-part of application No. 13/449,195, filed on Apr. 17, 2012, which is a continuation-in-part of application No. 13/432,993, filed on Mar. 28, 2012.

(51) Int. Cl.
*H01M 4/136* (2010.01)

(52) U.S. Cl.
USPC .................................. 429/231.8; 427/122

(58) Field of Classification Search
CPC ..... H01M 4/136; H01M 4/58; H01M 10/054; H01M 4/133; H01M 4/134; H01M 4/381; H02M 4/04; Y02E 60/122; Y02E 60/50; C01B 31/00; C01B 31/30; C01B 31/04; C01D 1/02; C01D 21/18
See application file for complete search history.

(56) References Cited

U.S. PATENT DOCUMENTS

| 6,599,580 | B2 | 7/2003 | Muffoletta et al. | |
|---|---|---|---|---|
| 2009/0183650 | A1 | 7/2009 | Doeff et al. | |
| 2012/0231335 | A1* | 9/2012 | Morita et al. | 429/213 |
| 2012/0237819 | A1* | 9/2012 | Ahn | 429/163 |
| 2012/0288759 | A1* | 11/2012 | Nagai et al. | 429/211 |
| 2012/0328936 | A1* | 12/2012 | Wessells et al. | 429/188 |

OTHER PUBLICATIONS

Pyrasch et al, Self-assembled films of Prussian blue and analogues: optical and electrochemical properties and application as ion-sieving membranes, Chemistry of Materials, 15.

Long Jiang et al, Synthesis, structures, and magnetic properties of a series of cyano-bridged Fe—Mn bimetallic complexes, Inorganic Chemistry, 45(2006)5018-5026.

Ali Eftekhari, Potassium secondary cell based on Prussian blue cathode, Journal of Power Sources, 126 (2004)221-228.

(Continued)

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

A structure of intimately contacting carbon-hexacyanometallate is provided for forming a metal-ion battery electrode. Several methods are provided for forming the carbon-hexacyanometallate intimate contact. These methods include (1) adding conducting carbon during the synthesis of hexacyanometallate and forming the carbon-hexacyanometallate powder prior to forming the paste for electrode printing; (2) coating with conducting carbon after hexacyanometallate powder formation and prior to forming the paste for electrode printing; and (3) coating a layer of conducting carbon over the hexacyanometallate electrode.

19 Claims, 7 Drawing Sheets

(56) References Cited

OTHER PUBLICATIONS

Robert Koncki, Tomasz Lenarczuk, Stanislaw Głąb, Optical sensing schemes for Prussian blue/Prussian white film system, Analytica Chimica Acta, 424(2000)27-35.

C.M. Julien et al., characterization of the carbon coating onto LiFePO4 particles used in lithium batteries, Journal of Applied physics, 100(2006) 063511.

Lupu et al., Electrochemical preparation and characterization of bilayer films composed by Prussian blue and conducting polymer, Electrochemistry Communications, 10(2002)753-.

\* cited by examiner

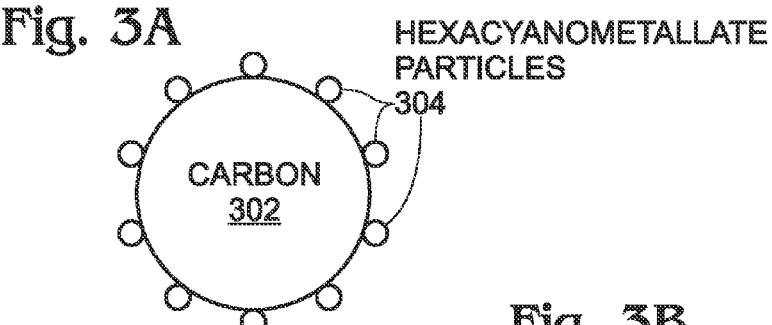
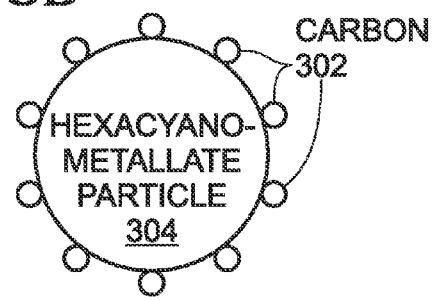
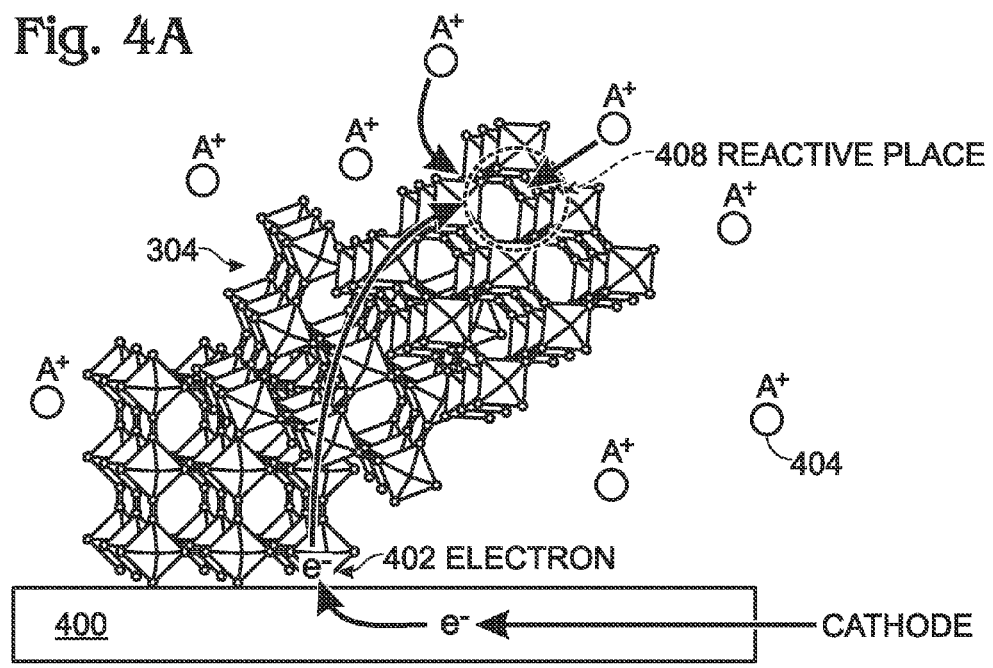

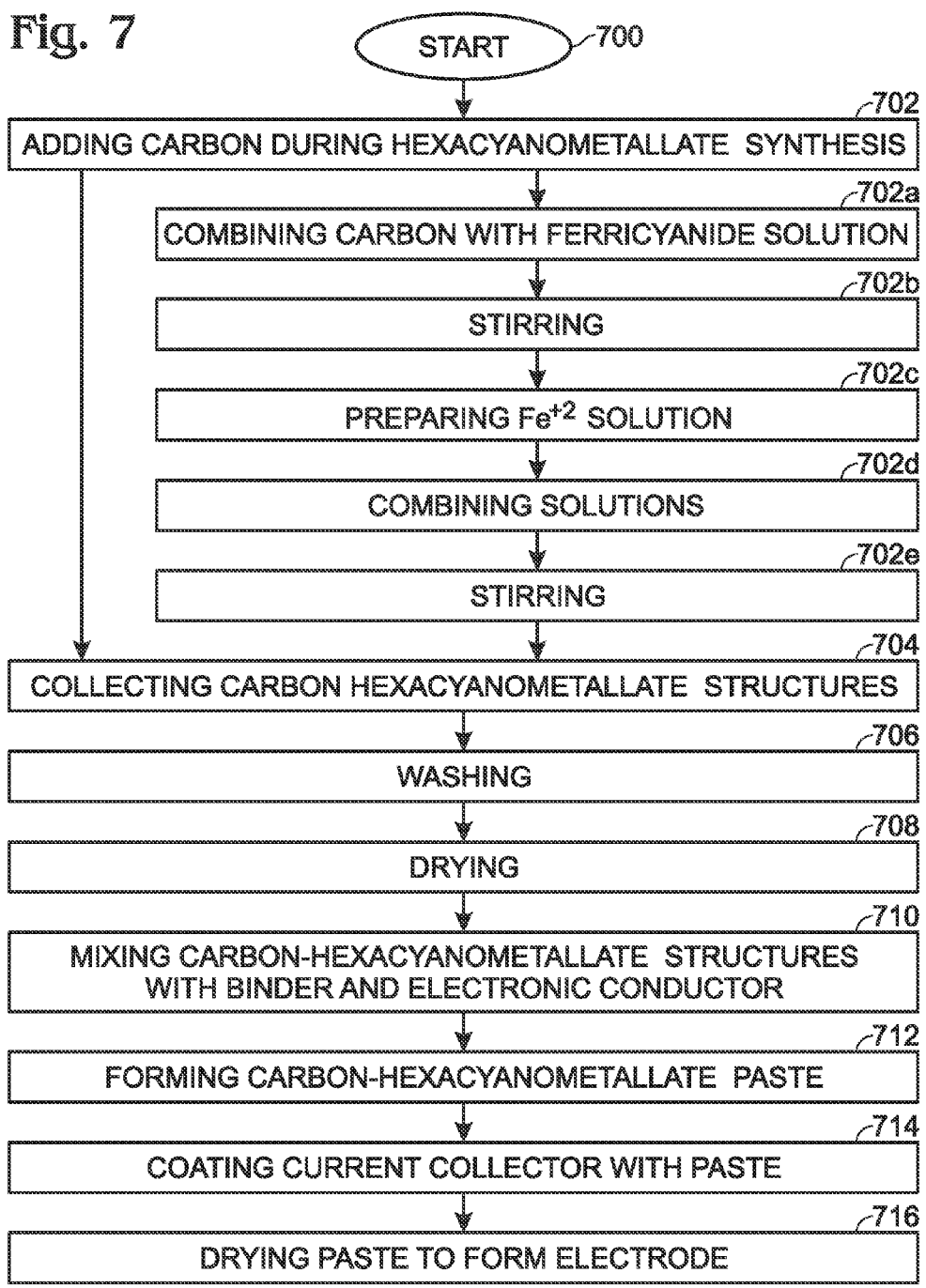

ELECTRON TRANSPORT IN HEXACYANOMETALLATE ELECTRODE FOR ELECTROCHEMICAL APPLICATIONS

RELATED APPLICATIONS

This application is a Continuation-in-Part of a pending application entitled, ALKALI AND ALKALINE-EARTH ION BATTER WITH HEXACYANOMETALLATE CATHODE AND NON-METAL ANODE, invented by Yuhao Lu et al., Ser. No. 13/449,195, filed Apr. 17, 2012;

which is a Continuation-in-Part of a pending application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012, All these applications are incorporated herein by reference.

BACKGROUND OF THE INVENTION

1. Field of the Invention

This invention, generally relates to electrochemical cells and, more particularly, to method for forming a carbon-hexacyanometallate battery electrode.

2. Description of the Related Art

A battery is an electrochemical cell through which chemical energy and electric energy can be converted back and forth. The energy density of a battery is determined by its voltage and charge capacity. Lithium has the most negative potential of −3.04 V vs. $H_2/H^+$, and has the highest gravimetric capacity of 3860 milli-amp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) exchange between the positive and negative electrodes. Li-ion batteries have been referred to as rocking chair batteries because the lithium ions "rock" each and forth between the positive and negative electrodes as the cells are charged and discharged. The positive electrode (cathode) materials is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector. In the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a $Li^+$-ion, it has one of the smallest radii of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

FIG. 1 depicts the framework for an electrode material with large interstitial spaces in a metal-ion battery (prior art). It is inevitable that the large interstitial spaces in these materials readily absorb water molecules and impure ions, as shown. Water molecules also occupy lattices positions in the electrode material. Although these open spaces are very suitable for the intercalation of metal-ions with large sizes, the water molecules and impure ions degrade the electrochemical performance. In this example, Prussian blue analogues (PBs) with cubic/tetragonal/hexagonal framework have open "zeolytic" lattices that permit $Na^+/K^+$-ions to move easily and reversibly in the framework.

FIG. 2 demonstrates the crystal structure of Prussian blue and its analogues (prior art). Their general molecular formula is $AM1M2(CN)_6 \cdot zH_2O$, in which tetrahedrally coordinated A site is an alkali or alkaline-earth ion, and M1 and M2 are metal ions. The M1 and M2 metals are arranged in a three-dimensional checkerboard pattern and shown in a two-dimensional pattern. The crystal structure is analogous to that of the $ABX_3$ perovskite. M1 and M2 metal ions are in ordered arrangement on the B sites. The M1 ions are octahedrally coordinated to the nitrogen ends of the CN— groups, and the M2 ions to their carbon ends. The M1 and M2 ions are connected by the C≡N to form the Prussian blue framework with large interstitial spaces.

The ratio of M1 and M2 may be an arbitrary number. The cyanide ligands (C≡N) octahedrally coordinate $M_1$ and $M_2$ to constitute a cubic framework that has a large interstitial space. The metal-ions or molecules of can locate in the interstitial space and balance the local charge. Although the molecular ratio for $A:M1:M1:H_2O$ in Prussian blue and its analogues is not precisely 1:1:1:0, the general molecular formula of $AM1M2(CN)_6$ is used herein for simplicity. The typical compounds of $AM1M2(CN)_6$ include Prussian white ($K_2Fe(II)Fe(II)(CN)_6$), Prussian blue ($KFe(II)Fe(III)(CN)_6$), Berlin green ($Fe(III)Fe(III)(CN)_6$) and their analogues. The bond dipole moment of C≡N is around 3.0 Debye, which makes the ordering of the M1 and M2 ions with different spin-states in the framework. The material of $AM1M2(CN)_6$ has demonstrated a variety of interesting functions in optics, magnetic, and electrochemistry.

In an electrochemical cell with $AM1M2(CN)_6$ as an electrode component, the electrochemical reaction can take place only if (1) a redox couple is in the structure, (2) ions can transport in/out of the structure, and (3) electrons can transport to balance the charge neutrality. For example, the electrochemical reaction taking place in Prussian blue can be expressed as follows:

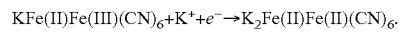

$$KFe(II)Fe(III)(CN)_6 + K^+ + e^- \rightarrow K_2Fe(II)Fe(II)(CN)_6.$$

In Prussian blue, the redox couple is $Fe^{2+}/Fe^{3+}$. In the reduction reaction, the $Fe^{3+}$ ion obtains an electron and reduces to $Fe^{2+}$, and a potassium-ion moves to the interstitial space of the compound to balance the charge. Once the ion diffusion or electron conduction becomes very slow, the reaction voltage departs from equilibrium (overpotential) and gives $V = V_{eq} - V_{over}$, in which '$V_{eq}$' is the equilibrium potential of the electrochemical reaction and '$V_{over}$' is the overpotential. Slower ion or electron transport leads to a high overpotential and a low reaction voltage. For a battery, its energy is $E = V \times I = (V_{eq} - V_{over}) \times I$, where 'I' is the current. A large overpotential and small current lead to the poor performance of the electrochemical reaction.

The $AM1M2(CN)_6$ material has a large interstitial space in which ions can easily move in and out of the lattice. Ion transport is not a limiting factor affecting the kinetic parameters of the electrochemical reaction. On the other hand, AM1M2(CN)$_6$ has a wide band gap between the valence and conduction bands. This means that the AM1M2(CN)$_6$ is a very poor electronic conductor. The dried Prussian blue, for example, is an insulator, and Prussian white and Berlin green are semiconductors. The slow electronic transport along the skeleton of M1-N≡C-M2 results in poor electrochemical performance in a system containing AM1M2(CN)$_6$.

The large interstitial sites may host the large sized alkali or alkaline-earth ions (A). Water molecules may also occupy lattice positions in the PB analogues. The ion channels connecting the interstitial sites are similar in size to solvated alkali ions such as sodium, potassium, and alkaline-earth ions such as magnesium and calcium, allowing rapid transport of these ions throughout the lattice. Therefore, PB is a good choice for an electrode material in sodium/potassium/magnesium/calcium-ion batteries. Nonetheless, thermogravimetric analysis (TG) suggests that every PB molecule contains four to six water molecules. The occupation of water and impure ions in these materials definitely reduces the spaces to host the metal-ions and leads to the reduced capacity of these electrode materials. Therefore, KCuFe(CN)$_6$ has a theoretical capacity of 85.2 mAh/g, but its practical capacity is smaller than 60 mAh/g. In addition, water may react with the intercalated metal-ions and decrease the coulombic and energy efficiencies of the metal-ion batteries. Up to now, no method has been reported to remove the water and impure ions from the large interstitial spaces and lattice positions of the hexacyanometallate electrode materials for metal-ions batteries. As a result, most metal-ions batteries with a hexacyanometallate electrode use an aqueous solution as an electrolyte. These batteries have small specific capacities and low voltages.

The open framework structure of the transition metal hexacyanometallates offers a faster and reversible intercalation process for alkali and alkaline-earth ions (A$_x$). In a metal-ion battery structure, the metal ions need to be stored in either the anode or cathode electrode before assembly. In the case of a Li-ion battery with LiCoO$_2$, LiFePO$_4$, and LiMn$_2$O$_4$ cathodes, the Li ions are stored in the cathode and the anode is carbon. Therefore, these batteries are assembled in a discharged state. These batteries need to be run through a charge cycle, to move the Li ions to the carbon anode, before they have any power for discharge. In the case of Li—S, Li-air and Na—S batteries, the metal ions are stored in anode. Actually, these anodes are made of Li and Na metals. These batteries are assembled in the charged state—meaning the battery can discharge immediately after assembly. Since alkali (e.g., Li, Na, and K), and other alkaline-earth (e.g., Mg and Ca) metals are very reactive with water vapor and oxygen, the manufacturing cost for such a battery would be prohibitively high, as the manufacturing has to be done in controlled environment.

In the case of sodium-ion batteries and potassium-ion batteries with hexacyanometallates AM1M2(CN)$_6$ as the cathode materials, it is easy to use a metal anode for the metal-ion battery. For example, a Na-ion battery can be made of a sodium anode and KFe$_2$(CN)$_6$ cathode, or a K-ion battery with potassium anode and KFe$_2$(CN)$_6$ cathode. However, these batteries must be assembled in controlled environment (H$_2$O-free, oxygen-free) if a metal anode is used.

It would be advantageous if electron transport could be improved in a AM1M2(CN)$_6$ battery electrode.

SUMMARY OF THE INVENTION

Described herein is a method to reduce the electron transport path in AM1M2(CN)$_6$ materials and to improve its performance in electrochemical applications. The method produces uniform and small size particles of AM1M2(CN)$_6$ material, making it a better electrical conductor. The method also reduces overpotential and increases the current for the electrochemical reaction of AM1M2(CN)$_6$.

Accordingly, a method is provided for forming a carbon-hexacyanometallate battery electrode. The method adds conducting carbon during the synthesis of hexacyanometallate. Carbon-hexacyanometallate (AM1M2(CN)$_6$) structures are collected, washed in deionized water, and then dried. In one aspect, adding carbon during the synthesis of hexacyanometallate includes: combining conducting carbon with a potassium ferricyanide solution, forming a first solution; stirring the first solution; preparing a Fe$^{2+}$ solution, combining the Fe$^{2+}$ solution with the first solution, forming a second solution; and, stirring the second solution. The collecting carbon-hexacyanometallate (AM1$_x$M2$_y$(CN)$_6$) structures are collected from the second solution.

The method may include the following additional steps. The carbon-hexacyanometallate structures are mixed with a binder and electronic conductor powder in a low boiling point solvent, forming a carbon-AM1M2(CN)$_6$ paste. A metal current collector is coated with the paste, and the paste is then dried to form an electrode.

Additional details of the above-described method are described below, along with an intimately contacting carbon-hexacyanometallate structure for battery electrode applications, and other methods for forming a carbon-hexacyanometallate battery electrode.

BRIEF DESCRIPTION OF THE DRAWINGS

FIGS. 3A and 3B are schematic drawings depicting different variations of an intimately contacting carbon-hexacyanometallate structure for battery electrode applications.

FIGS. 4A and 4B are drawings contrasting electron transport in uncoated and conductor-coated AM1M2(CN)$_6$ particles.

FIG. 7 is a flowchart illustrating method for forming a carbon-hexacyanometallate battery electrode in which KFe(II)Fe(III)(CN)$_6$ is used as an example.

DETAILED DESCRIPTION

FIGS. 3A and 3B are schematic drawings depicting different variations of an intimately contacting carbon-hexacyanometallate structure for battery electrode applications. The structure 300 comprises carbon (C) 302 and hexacyanometallate particles 304. A bond exists between the carbon 302 and the hexacyanometallate particles 304 that may be either a physical bond, caused by electrostatic attraction, or a chemical bond, caused by chemical reactions. From the hexacyanometallate formula $AM1_xM2_y(CN)_6$, x is in the range of 0.5 to 1.5, and y is in the range of 0.5 to 1.5.

The carbon 302 may take the form of particles having a size in the range of 10 nanometers (nm) to 20 microns, a carbon sheet, graphene, nanoparticles (less than 10 nm), nanotubes, or wires. As in the conventional meaning of the word, a nanotube, has a hollow center axis The hexacyanometallate particles 304 is smaller than the carbon 302, with a size in a range of 10 nm to 10 microns.

FIG. 3A depicts a plurality of hexacyanometallate particles bonded to each carbon form. FIG. 3B depicts a plurality of carbon forms bonded to each hexacyanometallate particle.

Conventionally, there are three steps for battery electrode fabrication. The first step is to fabricate the particles for battery electrode. In the case of $AM1M2(CN)_6$ particles, this includes precipitation of $AM1M2(CN)_6$ particles after mixing the $M1^{n+}$ (n=2 or 3) solution and $[M2(CN)_6]^{m-}$ (m=3 or 4) solution. The second step is to mix the $AM1M2(CN)_6$ particles with conductive carbon particles and organic binders (polytetrafluoroethylene (PTFE), polyvinylidene fluoride (PVDF), etc.) in a low boiling point solvent to form a paste. The mixing can be done by adding together all components and mixing them in a ball mill jar. The third step is to coat the paste on a metal foil as the current collector. After the drying process, the electrode can be used in electrochemical cell. However, since the particles are very small, the conductive carbon particles do not totally cover the $AM1M2(CN)_6$ particle.

In order to form the $C-AM1M2(CN)_6$ intimate contact, and to improve the electron conduction, the carbon can be added and forms intimate contact to $AM1M2(CN)_6$ in three scenarios: during the $AM1M2(CN)_6$ synthesis, after AM1M2 $(CN)_6$ particle formation and prior to the electrode printing, and after the electrode formation and drying. FIGS. 4A through 6 describe processes for forming $C-AM1M2(CN)_6$ intimate contact.

Figure 5:
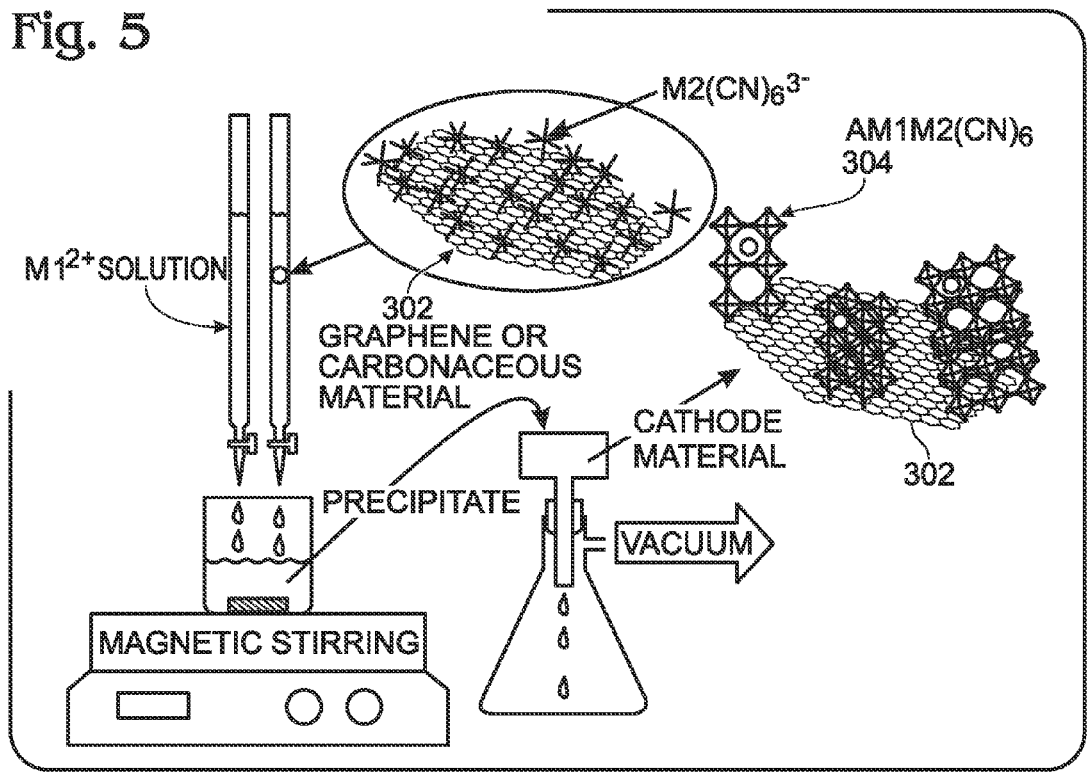
FIG. 5 is a schematic drawing depicting a one-step hexacyanometallate coating method during AM1M2(CN)$_6$ synthesis.

FIG. 5 is a schematic drawing depicting a one-step hexacyanometallate coating method during $AM1M2(CN)_6$ synthesis. An electronic conductor, for example graphene or other carbonaceous material, is dispersed in a reactant solution. In general, the electronic conductor has a large surface area to which a soluble reactant can be uniformly adsorbed. The reactants are dropped into a reactor very slowly with a strong stirring. After the reaction, $AM1M2(CN)_6$ with a small particle size uniformly forms on the surface of the electronic conductor. In the synthesis of the Prussian blue, for example, the reaction can be simply expressed as:

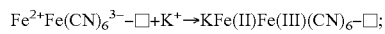

$$Fe^{2+}+Fe(CN)_6^{3-}-\square+K^+ \rightarrow KFe(II)Fe(III)(CN)_6-\square;$$

where $\square$ is the electronic conductor.

More explicitly, a carbon black (surface area: 10-100 m²/g) is dispersed in a potassium ferricyanide solution (its concentration can be controlled at 0.0005M-0.5 M). The ratio of potassium ferricyanide to carbon black is determined by its application. In one example, the ratio is 80:20. A water-soluble surfactant can be added into the solution in order to obtain a uniform carbon suspension. After two-hours of ultrasonic stirring, the solution is poured into a burette. In the other burette, a $Fe^{2+}$ solution is prepared. The mole ration of $Fe^{2+}$ to ferricyanide is 2:1. The two solutions are dripped into a beaker very slowly with strong stirring. After the solutions completely drip off, the beaker is still kept stirring for 5 hours. The product in the beaker is filtered or centrifuged. After at least three washes in deionized water, the product is dried in a vacuum drier overnight.

Figure 10A:
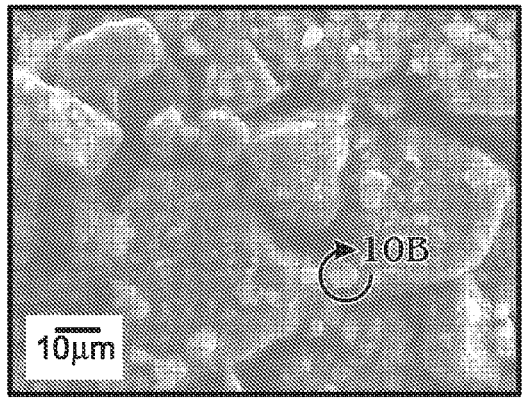
FIGS. 10A and 10B are scanning electron microscope (SEM) images of KNiFe(CN)$_6$.
Figure 10B:
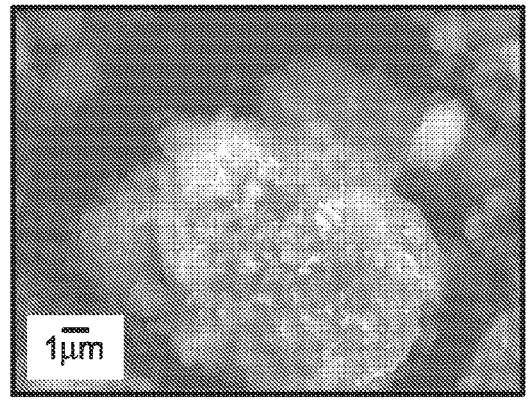

FIGS. 10A and 10B are scanning electron microscope (SEM) images of $KNiFe(CN)_6$. As an example, $KNiFe(CN)_6$ was synthesized with carbon black using the above-described method. FIG. 10A shows $KNiFe(CN)_6$ particles uniformly coated on the surface with carbon powder. The carbon black not only improves the electronic conductivity of $KNiFe(CN)_6$, but it also favors the small and uniform $KNiFe(CN)_6$ particle formation. The electrical performance of the battery made of $C-KNiFe(CN)_6$ particles was compared to the battery made of $KNiFe(CN)_6$ particles. FIG. 10B is a more detailed image of a carbon particle.

Figure 11A:
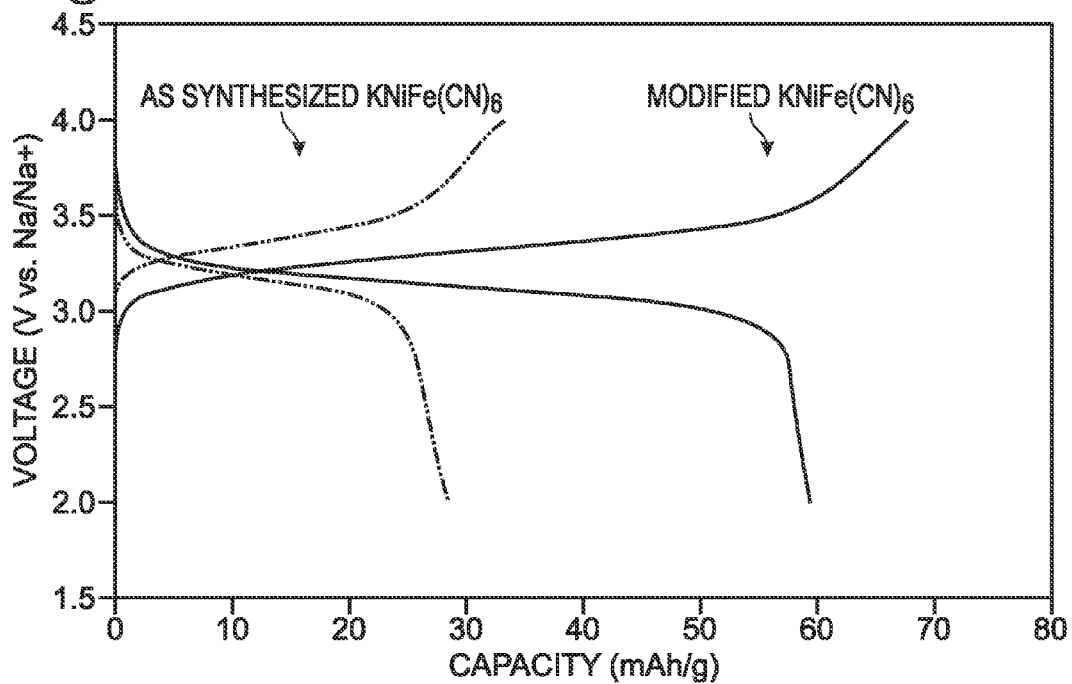
FIGS. 11A and 11B depict, respectively, the charge and discharge behavior of the two batteries.
Figure 11B:
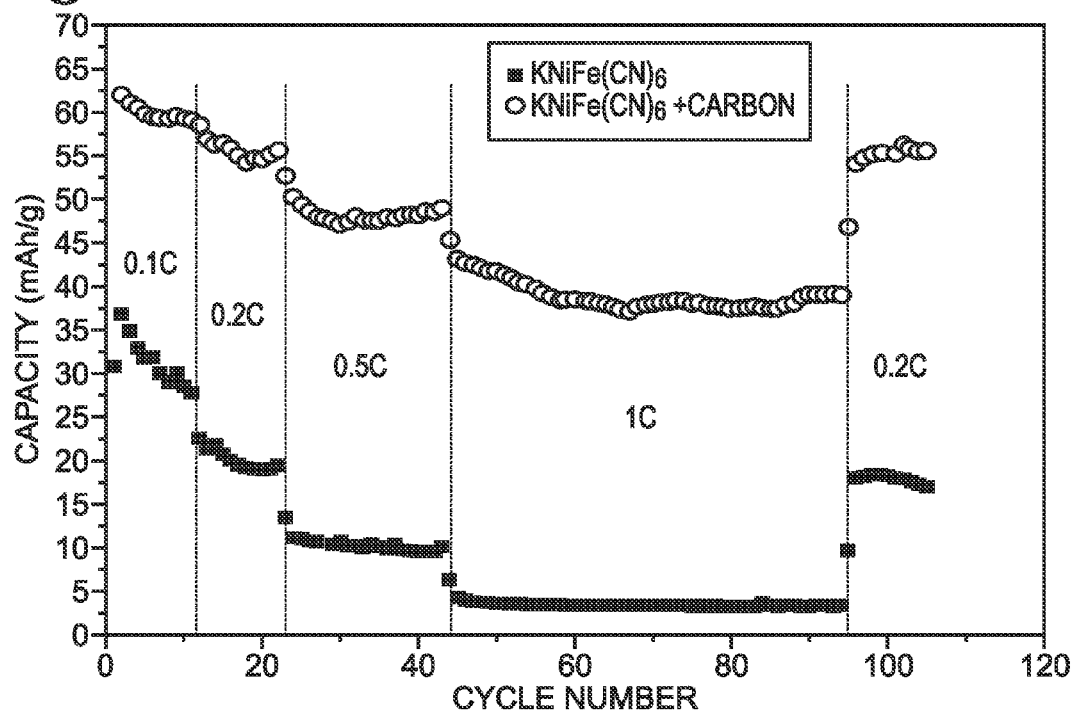

FIGS. 11A and 11B depict, respectively, the charge and discharge behavior of the two batteries. For the battery made of $C-KNiFe(CN)_6$ particles (modified), small particle size and better conductivity improves the utilization of the electrode materials and increases specific capacities, as compared to the battery made of (as-synthesized) $KNiFe(CN)_6$ particles. The discharge capacity of electrode made of $C-KNiFe(CN)_6$ particles is about 60 mAh/g, but that of pure $KNiFe(CN)_6$ is smaller than 30 mAh/g. In addition, the battery made of $C-KNiFe(CN)_6$ particles demonstrates a capacity of about 40 mAh/g at the 1 C charge rate. With the same conditions, the battery made of pure $KNiFe(CN)_6$ shows a very low capacity.

Figure 6:
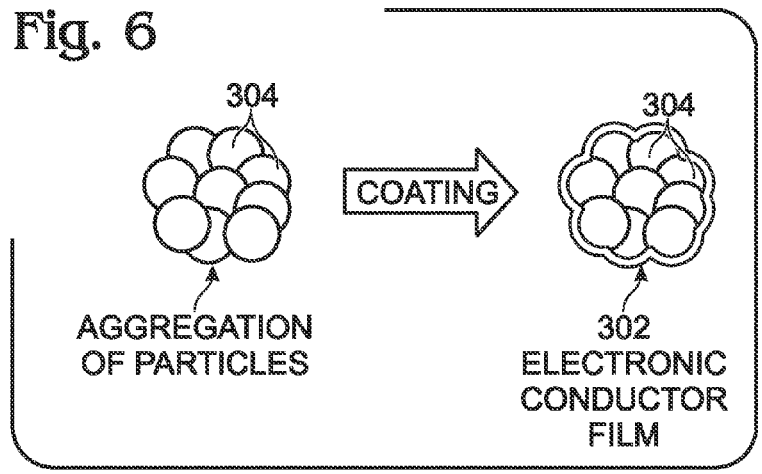
FIG. 6 is a drawing depicting a conducting film coating on AM1M1(CN)$_6$ particles.

FIG. 6 is a drawing depicting a conducting film coating on $AM1M1(CN)_6$ particles. The $C-AM1M2(CN)_6$ intimate contact can be formed after $AM1M2(CN)_6$ particle synthesis, but prior to the to the electrode printing. Small particles of $AM1M2(CN)_6$ 304 can be synthesized with the reaction of $M1^{n+}$ (n=2 or 3) and $[M2(CN)_6]^{m-}$ (m=3 or 4) ions. Once the particles of $AM1M2(CN)_6$ are obtained, a layer of electronic conductor, such as carbon 302, can be coated on their surface using physical or chemical methods. For example, atomic layer deposition (ALD), physical vapor deposition (PVD), chemical vapor deposition (CVD), hydrothermal synthesis, or ball milling method, etc., can be used to coat the layer of electronic conductor. However, two problems are worth noting. One is that some electronic conductors have very high reductive activity, for example, carbonaceous materials that can reduce $M_1$ and $M_2$ from the high valence to the low valence. For example, in the process of using the hydrothermal method to coat the carbon layer on the surface of $KFe(II)Fe(III)(CN)_6$, the material can be reduced to $K_2Fe(II)Fe(II)(CN)_6$.

The other problem is the selection of the electronic conductor for the coating. After the coating process, the electronic conductor layer is covered on the particles uniformly. For the electrochemical reaction to occur on the $AM1M2(CN)_6$, the layer of the electronic conductor must be 'A' ion-permeable. In other words, the layer of the electronic conductor cannot retard the 'A' ion transport between the $AM1M2(CN)_6$ particle and the electrolyte. In some cases, the conducting film 302 does not have to be continuous so that $AM1M2(CN)_6$ particles have direct contact to the electrolyte and "A" ions are readily intercalating/deintecalating to the $AM1M2(CN)_6$ particles.

Figure 1:
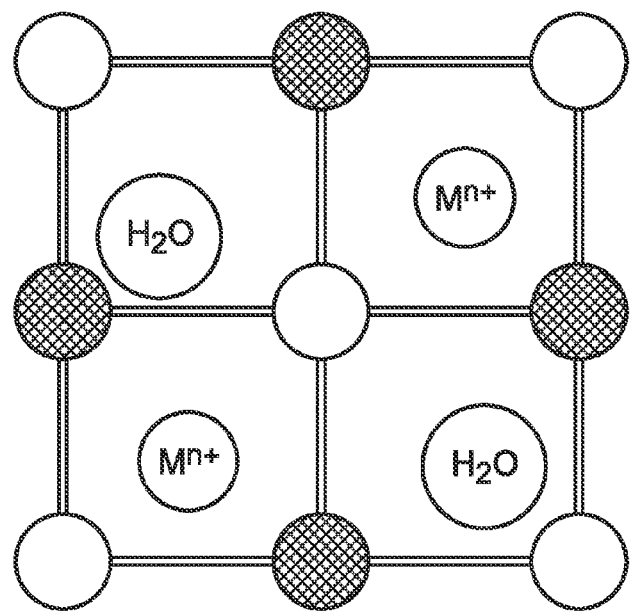
FIG. 1 depicts the framework for an electrode material with large interstitial spaces in a metal-ion battery (prior art).
Figure 2:
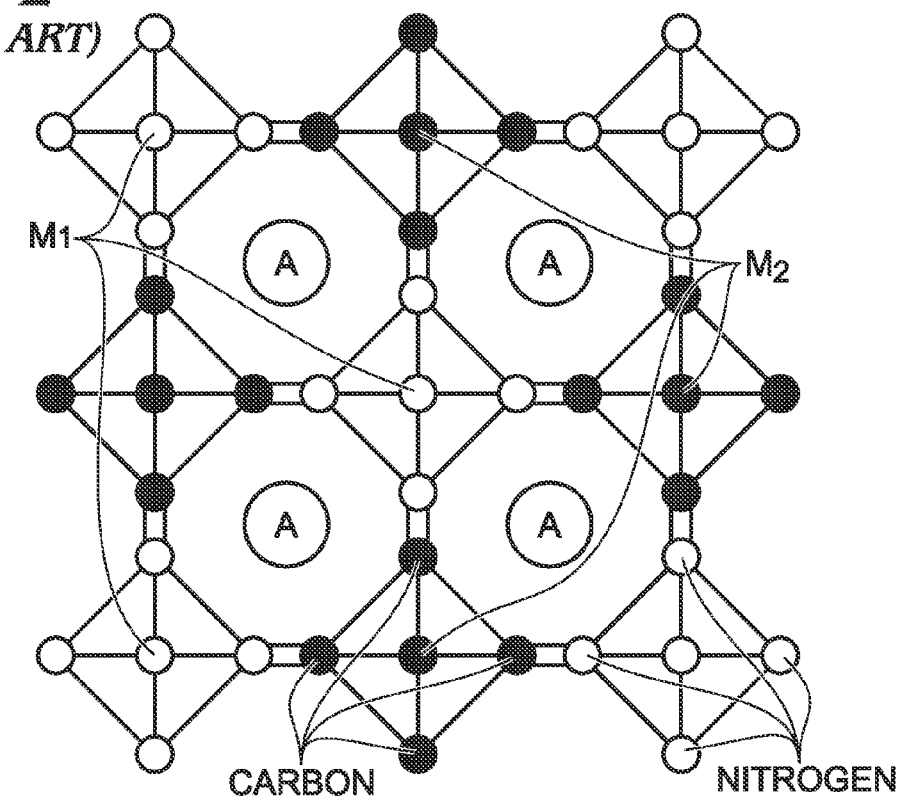
FIG. 2 demonstrates the crystal structure of Prussian blue and its analogues (prior art).
Figure 4B:
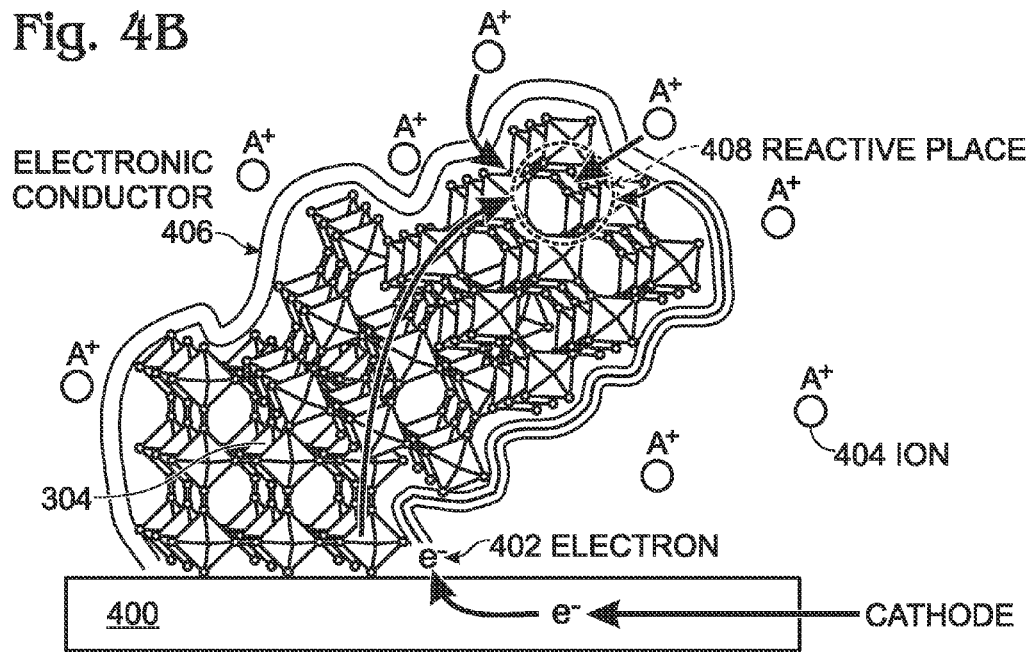

4A and 4B are drawings contrasting electron transport in uncoated and conductor-coated $AM1M2(CN)_6$ particles. In this aspect the conducting film can be deposited after the electrode formation. Obtaining small and uniformly distributed particle is a step to improving the electronic transport in the $AM1M2(CN)_6$. For clarity, an electrode 400 (cathode) is shown with only one $AM1M2(CN)_6$ particle 304. In a small $AM1M2(CN)_6$ particle, the transport path between an electron 402 and ions 404 is shortened. The ion ($A^+$) 404 conduction is through an electrolyte surrounding the $AM1M2(CN)_6$ particle. After going into the $AM1M2(CN)_6$ lattice, the $A^+$ ions 404 move through the large interstitial sites in a direction towards a more negative potential. On the other hand, the electron 402 is moving within the $AM1M2(CN)_6$ material. The electron 402 movement in the $AM1M2(CN)_6$ particle 404 is basically governed by the electron conductivity behavior of the $AM1M2(CN)_6$ material. It is known that $AM1M2(CN)_6$ has low electron conductivity, which results in a slow electrochemical reaction. To improve the electron conductivity of $AM1M2(CN)_6$ electrode, it is possible to coat a good electronic conductor 406 on the $AM1M2(CN)_6$ surface. One example of good electronic conductor is carbon. The electronic conductor 406 provides a highway for the fast electrons transport as shown in FIG. 4B. In the reduction reaction of $AM1M2(CN)_6$, 'A'-ions diffuse to the reactive place 408 along the interstitial space, but electrons 402 can move to reactive place along the external electronic conductor 406. Therefore, the electrochemical reaction has a small overpotential and a large current.

The A cations may be either alkali or alkaline-earth cations. For example, the A cations may be $Na^+$, $K^+$, $Mg^{2+}$, or $Ca^{2+}$. M1 is a metal with 2+ or 3+ valance positions. Likewise, M2 is a metal with 2+ or 3+ valance positions. For example, the M1 and M2 metals may be Ti, V, Cr, Mn, Fe, Co, Ni, Cu, Zn, Ca, or Mg. The M1 metal may be the same metal as the M2 metal, or a different metal than the M2 metal.

FIG. 7 is a flowchart illustrating method for forming a carbon-hexacyanometallate battery electrode in which KFe(II)Fe(III)(CN)$_6$ is used as an example. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 adds conducting carbon during the synthesis of hexacyanometallate. The conducting carbon can be the form of a particle having a size in a range of 10 nm to 20 microns, a carbon sheet, graphene, nanoparticles, nanotubes, or wires. Step 704 collects carbon-hexacyanometallate ($AM1M2(CN)_6$) structures. Step 706 washes the carbon-hexacyanometallate structures in deionized water. Step 708 dries the carbon-hexacyanometallate structures. Step 710 mixes the carbon-hexacyanometallate structures with a hinder and electronic conductor powder in a low boiling point solvent. Step 712 forms a carbon-$AM1M2(CN)_6$ paste. Step 714 coats a metal current collector with the paste. Step 716 dries the paste to form an electrode.

In one aspect, adding carbon during the synthesis of hexacyanometallate in Step 702 includes substeps. Step 702a combines conducting carbon with a potassium ferricyanide solution, forming a first solution. Step 702b stirs the first solution. Step 702c prepares a $Fe^{2+}$ solution. Step 702d combines the $Fe^{2+}$ solution with the first solution, forming a second solution. Step 702e stirs the second solution. Then, Step 704 includes collecting carbon-hexacyanometallate, $(AM1M2(CN)_6)$ structures from the second solution. In one aspect, the combination of Steps 702a and 702e form a specific $AM1M2(CN)_6$ material, which may be $KFeFe(CN)_6$ for example. Other methods of enabling Step 702 would he known in the art.

Step 712 may form a carbon-$AM1M2(CN)_6$ paste with a plurality of hexacyanometallate particles bonded to each carbon form, where the bond is a physical bond or a chemical bond. Alternatively, Step 712 may form the carbon-$AM1M2(CN)_6$ paste with a plurality of carbon forms bonded (chemical or physical) to each hexacyanometallate particle. Either way, Step 712 forms the carbon-$AM1M2(CN)_6$ paste with hexacyanometallate particles have a size in the range of 10 nm to 10 microns.

Figure 8:
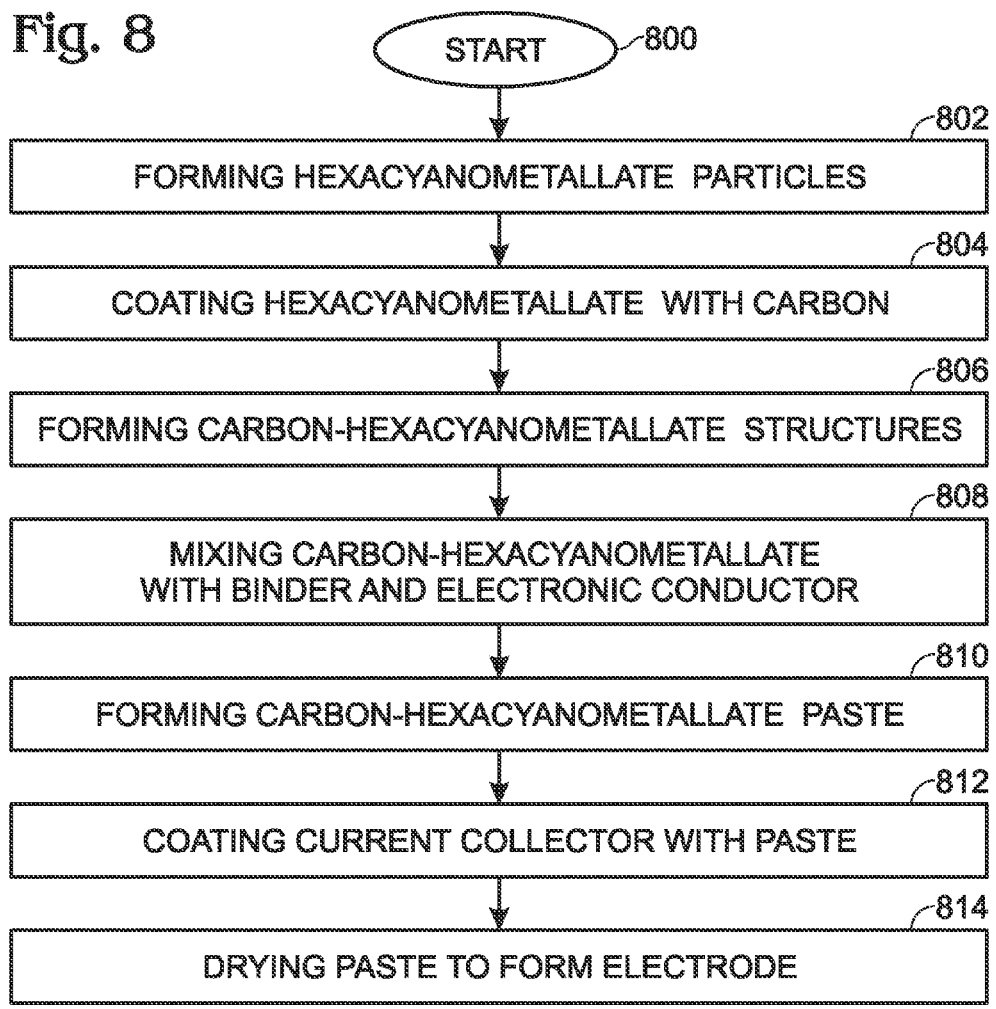
FIG. 8 is a flowchart illustrating an alternate method for forming a carbon-hexacyanometallate battery electrode.

FIG. 8 is a flowchart illustrating an alternate method for forming a carbon-hexacyanometallate battery electrode. The method begins at Step 800. Step 802 forms hexacyanometallate particles. In one aspect, the hexacyanometallate particles have a size in the range of 10 nm to 10 microns. The hexacyanometallate particles may be formed using one of the following processes: template, hydrothermal, co-deposition, or sonochemical synthesis.

Step 804 coats the hexacyanometallate particles with a conducting carbon. The conducting carbon may be in the form of particles having a size in the range of 10 nm to 20 microns, a carbon sheet, graphene, nanoparticles, nanotubes, or wires. The coating may be performed using one of the following processes: atomic layer deposition (ALD), physical vapor deposition (PVD), chemical vapor deposition (CVD), hydrothermal synthesis, or ball milling. Step 806 forms carbon-hexacyanometallate structures. Step 808 mixes the carbon-hexacyanometallate structures with a binder and electronic conductor powder in a low boiling point solvent. Step 810 forms a carbon-$AM1M2(CN)_6$ paste. Step 812 coats a metal current collector with the paste. Step 814 dries the paste to form an electrode.

In one aspect, forming the carbon-$AM1M2(CN)_6$ paste in Step 810 includes forming a paste with a plurality of carbon atoms bonded to each hexacyanometallate molecule, where the bond is a physical bond or a chemical bond.

Figure 9:
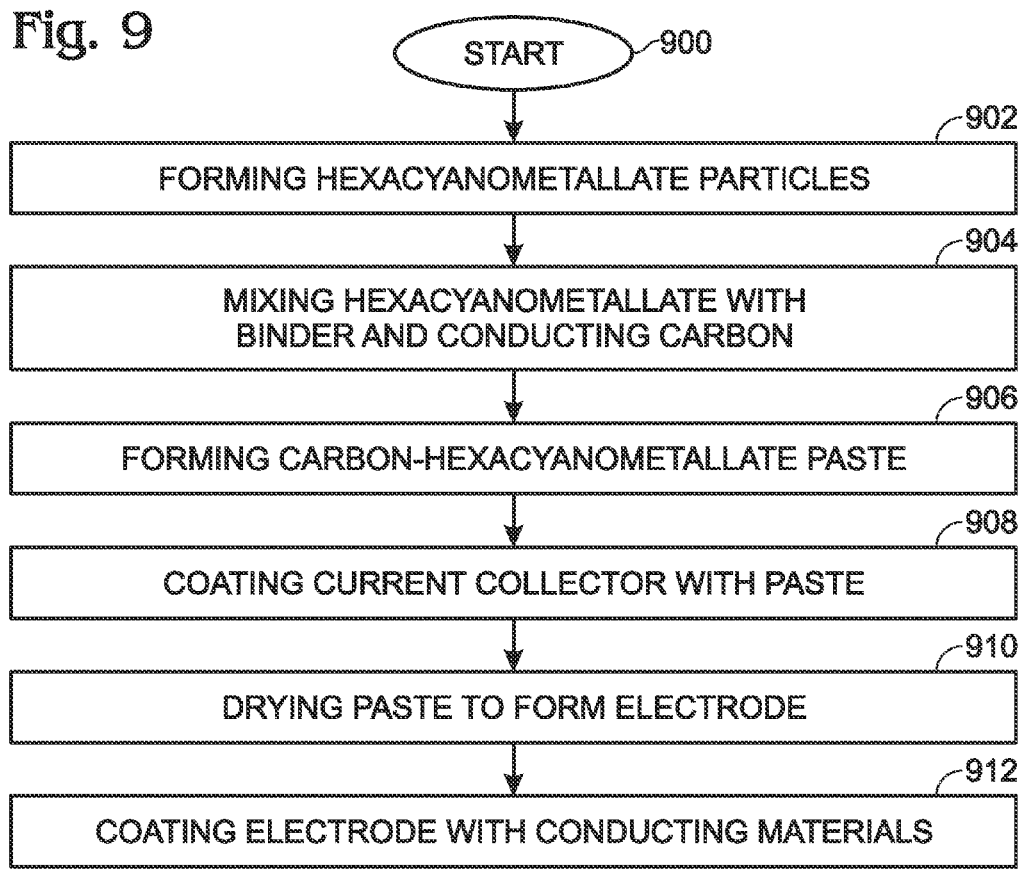
FIG. 9 is a flowchart illustrating another variation of a method for forming a carbon-hexacyanometallate, battery electrode.

FIG. 9 is a flowchart illustrating another variation of a method for forming a carbon-hexacyanometallate, battery electrode. The method begins at Step 900. Step 902 forms hexacyanometallate particles. In one aspect, the hexacyanometallate particles have a size in the range of 10 nm to 10 microns. Step 904 mixes the hexacyanometallate particles with a binder and electronic conductor powder in a low boiling point solvent. Step 906 forms a carbon-$AM1M2(CN)_6$ paste. Step 908 coats a metal current collector with the paste. Step 910 dries the paste to form an electrode. Step 912 coats the electrode with a layer of conducing materials.

In one aspect, coating the electrode with the layer of conducting materials in Step 912 includes using a deposition process such as CVD, vapor phase ALD, or liquid phase coating. In another aspect, Step 912 uses a conducting material having a thickness in the range from 0.5 nm to 20 nm, where the material is either carbon or a metal material. The C-$AM1M2(CN)_6$ in the conducting material coating the electrode includes carbon that either fully covers or partially covers the $AM1M2(CN)_6$ particle surfaces.

Methods have been provided for forming a carbon-hexacyanometallate battery electrode, as well as a carbon-hexacyanometallate structure. Examples of particular materials and process steps have been presented to illustrate the invention. However, the invention is not limited to merely these examples. Other variations and embodiments of the invention will occur to those skilled in the art.

We claim:

1. A method for forming a carbon-hexacyanometailate battery electrode, the method comprising:
   adding conducting carbon during the synthesis of hexacyanometallate;
   collecting carbon-hexacyanometallate $(AM1M2(CN)_6)$ structures;
   washing the carbon-hexacyanometallate structures in deionized water; and,
   drying the carbon-hexacyanometallate structures.

2. The method of claim 1 wherein adding carbon during the synthesis of hexacyanometallate includes:
   combining conducting carbon with a potassium ferricyanide solution, forming a first solution;
   stirring the first solution;
   preparing a $Fe^{2+}$ solution;
   combining the $Fe^{2+}$ solution with the first solution, forming a second solution;
   stirring the second solution; and,
   wherein collecting carbon-hexacyanometallate (AM1M2 $(CN)_6$) structures includes collecting carbon-hexacyanometallate (AM1M2$(CN)_6$) structures from the second solution.

3. The method of claim 1 further comprising;
   mixing the carbon-hexacyanometallate structures with a binder and electronic conductor powder in a low boiling point solvent;
   forming a carbon-AM1M2$(CN)_6$ paste;
   coating a metal current collector with the paste; and,
   drying the paste to form an electrode.

4. The method of claim wherein adding conducting carbon includes the conducting carbon being in a form selected from a group consisting of a particle having a size in a range of 10 nanometers (nm) to 20 microns, a carbon sheet, graphene, nonoparticles, nanotubes, and wires.

5. The method of claim 4 wherein forming the carbon-AM1M2$(CN)_6$ paste includes forming a paste with a plurality of hexacyanometallate particles bonded to each carbon form, where the bond is selected from a group consisting of a physical bond and a chemical bond.

6. The method of claim 3 wherein forming the carbon-AM1M2$(CN)_6$ paste includes forming a paste with a plurality of carbon forms bonded to each hexacyanometallate particle, where the bond is selected from a group consisting of a physical bond and a chemical bond.

7. The method of claim 3 wherein forming the carbon-AM1M2$(CN)_6$ paste includes forming a paste with hexacyanometallate particles have a size in a range of 10 nm to 10 microns.

8. A method for forming a carbon-hexacanometailate battery electrode, the method comprising:
   forming hexacyanometallate (AM1M2$(CN)_6$) particles;
   coating the hexacyanometallate particles with a conducting carbon; and,
   forming carbon-AM 1M2$(CN)_6$ structures.

9. The method of claim 8 further comprising:
   mixing the carbon-hexacyanometallate structures with a binder and electronic conductor powder in a low boiling point solvent;
   forming a carbon-AM1$_x$ M2$_y$(CN)$_6$ paste;
   coating a metal current collector with the paste; and,
   drying the paste to form an electrode.

10. The method of claim 8 wherein coating the hexacyanometallate particles with the conducting carbon includes using conducting carbon in a form selected from a group consisting of a particle having a size in a range of 10 nanometers (nm) to 20 microns, a carbon sheet, graphene, nanoparticles, nanotubes, and wires.

11. The method of claim 9 wherein forming the carbon-AM1M2$(CN)_6$ paste includes forming a paste with a plurality of carbon atoms bonded to each hexacyanometallate molecule, where the bond is selected from a group consisting of a physical bond and a chemical bond.

12. The method of claim 8 wherein forming hexacyanometallate particles includes forming the hexacyanometallate particles using a process selected from a group consisting of template, hydrothermal, co-deposition, and sonochemical synthesis.

13. The method of claim 8 wherein coating the hexacyanometallate particles with the conducting carbon includes using a process selected from a group consisting of atomic layer deposition (ALD), physical vapor deposition (PVD), chemical vapor deposition (CVD), hydrothermal synthesis, and ball milling.

14. The method of claim 8 wherein forming hexacyanometallate particles includes forming hexacyanometallate particles having a size in a range of 10 nm to 10 microns.

15. A method for forming a carbon-hexacyanometallate battery electrode, the method. comprising:
   forming hexacyanometallate particles;
   mixing the hexacyanometallate particles with a binder and a conducting carbon powder in a low boiling point solvent;
   forming a carbon-AM1M2$(CN)_6$ paste comprising hexacyanoinetailate particles coated. with the conducting carbon;
   coating a metal. current collector with the paste;
   drying the paste to form. an. electrode; and,
   coating the electrode with a layer of conducing materials.

16. The method, of claim 15 wherein coating the electrode with the layer of materials includes using a deposition process selected from a group consisting of chemical vapor deposition (CND), vapor phase atomic layer deposition (ALD), and liquid phase coating.

17. The method of claim 15 wherein coating the electrode with the layer of conducting materials includes using a conducting material having a thickness in a range from 0.5 nanometers (pm) to 20 nm, where the material, is selected from a group consisting of carbon (C) and a metal material.

18. The method of claim 15 wherein coating the electrode with the layer of materials includes coating with carbon in a. manner selected from a group consisting of fully covering and partially covering the AM1M2$(CN)_6$ particle surfaces.

19. The method of claim 15 wherein forming the hexacyanometallate particle includes forming hexacyanometallate particles having a size in a range of 10 nm to 10 microns.

* * * * *

UNITED STATES PATENT AND TRADEMARK OFFICE
CERTIFICATE OF CORRECTION

PATENT NO. : 8,956,760 B2
APPLICATION NO. : 13/523694
DATED : February 17, 2015
INVENTOR(S) : Yuhao Lu et al.

Page 1 of 1

It is certified that error appears in the above-identified patent and that said Letters Patent is hereby corrected as shown below:

In the Claims,

Column 9, line 21, claim 4: the numeral "1" is missing after the word "claim".

Column 10, line 40, claim 16: the abbreviation --CND-- should be printed as "CVD".

Column 10, line 45, claim 17: the abbreviation --pm-- should be printed as "nm".

Signed and Sealed this
Twelfth Day of May, 2015

Michelle K. Lee
*Director of the United States Patent and Trademark Office*